(12) United States Patent
Zaid et al.

(10) Patent No.: US 9,272,739 B2
(45) Date of Patent: Mar. 1, 2016

(54) URBAN VEHICLE

(71) Applicant: RoadIX Urban Transportation Ltd., Rosh Ha'ain (IL)

(72) Inventors: Amir Zaid, Givat Ada (IL); Benny Shimon, Holon (IL)

(73) Assignee: ROADIX URBAN TRANSPORTATION LTD., Rosh Ha'ain (IL)

( * ) Notice: Subject to any disclaimer, the term of this patent is extended or adjusted under 35 U.S.C. 154(b) by 0 days.

(21) Appl. No.: 14/378,530

(22) PCT Filed: Feb. 13, 2013

(86) PCT No.: PCT/IL2013/050142
§ 371 (c)(1),
(2) Date: Aug. 13, 2014

(87) PCT Pub. No.: WO2013/128437
PCT Pub. Date: Sep. 6, 2013

(65) Prior Publication Data
US 2015/0035257 A1 Feb. 5, 2015

Related U.S. Application Data

(60) Provisional application No. 61/597,927, filed on Feb. 13, 2012.

(51) Int. Cl.
*A63C 17/04* (2006.01)
*B62D 31/00* (2006.01)
(Continued)

(52) U.S. Cl.
CPC .............. *B62D 31/006* (2013.01); *B62D 51/02* (2013.01); *B62K 3/002* (2013.01); *B62K 5/05* (2013.01); *B62K 15/008* (2013.01); *B62K 21/12* (2013.01)

(58) Field of Classification Search
USPC .................. 280/87.05, 38, 62, 11.26, 87.041, 280/87.042; 180/181
See application file for complete search history.

(56) References Cited

U.S. PATENT DOCUMENTS 6,336,645 B1 * 1/2002 Wang et al. .............. 280/87.041
6,341,790 B1 * 1/2002 Chen ........................ 280/87.041
(Continued)

FOREIGN PATENT DOCUMENTS

DE 4410304 A1 11/1995
DE 10209093 A1 9/2003
(Continued)

OTHER PUBLICATIONS

Fly through the airport with Samsonite scooter luggage—http://www.pocket-lint.com/news/110864/micro-luggage-samsonite-scooter-suitcase, 7 pages.
(Continued)

*Primary Examiner* — Jeffrey J Restifo
(74) *Attorney, Agent, or Firm* — Blue Filament Law PLLC; Avery N. Goldstein

(57) ABSTRACT

A scooter (10) is provided comprising a deck portion (12) mounted on a pair of front wheels (14); at least one tail portion (16) foldably coupled to the deck portion (12) and being narrower than the deck portion (12) and mounted on at least one rear wheel (18) thereby providing the deck portion (12) with stability. The scooter (10) further includes a steering post (20) coupled to the front wheels (14) and being foldable with respect to the deck portion (12).

18 Claims, 18 Drawing Sheets

(51) Int. Cl.
    *B62K 3/00*     (2006.01)
    *B62K 15/00*     (2006.01)
    *B62D 51/02*     (2006.01)
    *B62K 5/05*     (2013.01)
    *B62K 21/12*     (2006.01)

(56) References Cited

U.S. PATENT DOCUMENTS

| | | | |
|---|---|---|---|
| 6,467,560 B1* | 10/2002 | Anderson | 180/181 |
| 7,134,677 B2* | 11/2006 | Opsvik | 280/87.041 |
| 7,192,038 B2* | 3/2007 | Tsai | 280/87.041 |
| 7,954,831 B1* | 6/2011 | Yeh | 280/87.042 |
| 8,231,133 B2* | 7/2012 | Walther et al. | 280/87.021 |
| 8,282,113 B2* | 10/2012 | Veal et al. | 280/87.041 |
| 8,465,033 B2* | 6/2013 | Benarrouch | 280/87.05 |
| 8,500,147 B2* | 8/2013 | Johnson | 280/87.05 |
| 8,517,403 B2* | 8/2013 | Jessie, Jr. | 280/87.041 |
| 8,695,999 B2* | 4/2014 | Von Bismarck | 280/87.041 |
| 8,696,000 B1* | 4/2014 | Chen | 280/87.041 |
| 8,720,918 B2* | 5/2014 | Liao | 280/87.05 |
| 8,827,286 B2* | 9/2014 | Woncik | 280/87.042 |
| 8,857,832 B2* | 10/2014 | Smith | 280/87.05 |
| 2002/0089137 A1* | 7/2002 | Chang et al. | 280/87.041 |
| 2005/0242537 A1* | 11/2005 | Opsvik | 280/87.05 |
| 2009/0160150 A1* | 6/2009 | Johnson | 280/87.041 |
| 2012/0018968 A1* | 1/2012 | Joslin et al. | 280/87.041 |
| 2012/0068427 A1* | 3/2012 | Alva | 280/87.05 |
| 2012/0098238 A1* | 4/2012 | Wang et al. | 280/655.1 |
| 2012/0104714 A1* | 5/2012 | Sapir | 280/87.05 |
| 2012/0256386 A1* | 10/2012 | Benarrouch | 280/87.05 |
| 2012/0292882 A1* | 11/2012 | Ghisolfi et al. | 280/287 |

FOREIGN PATENT DOCUMENTS

| | | |
|---|---|---|
| EP | 1950126 A1 | 7/2008 |
| GB | 2279921 A | 1/1995 |
| GB | 2423061 A | 8/2006 |
| GB | 2477512 A | 8/2011 |
| WO | 01/64502 A2 | 9/2001 |
| WO | 02/36419 A1 | 5/2002 |
| WO | 03/055737 A1 | 7/2003 |
| WO | 03/093093 A1 | 11/2003 |
| WO | 2012/004477 A2 | 1/2012 |
| WO | 2012/108760 A2 | 8/2012 |

OTHER PUBLICATIONS

NEXUS: Electric Powered Suitcase/scooter—http://1nation.eu/post/439471876/nexus-electric-powered-suitcase-scooter-while, 2 pages.
Electric Suitcase Scooter—http://www.thisiswhyimbroke.com/electric-suitcase-scooter, 3 pages.
Everywhere Foldable Electric Scooter is easy to carry around—http://www.spicytec.com/2011/12/everywhere-foldable-electric-scooter-is.html, 5 pages.

* cited by examiner

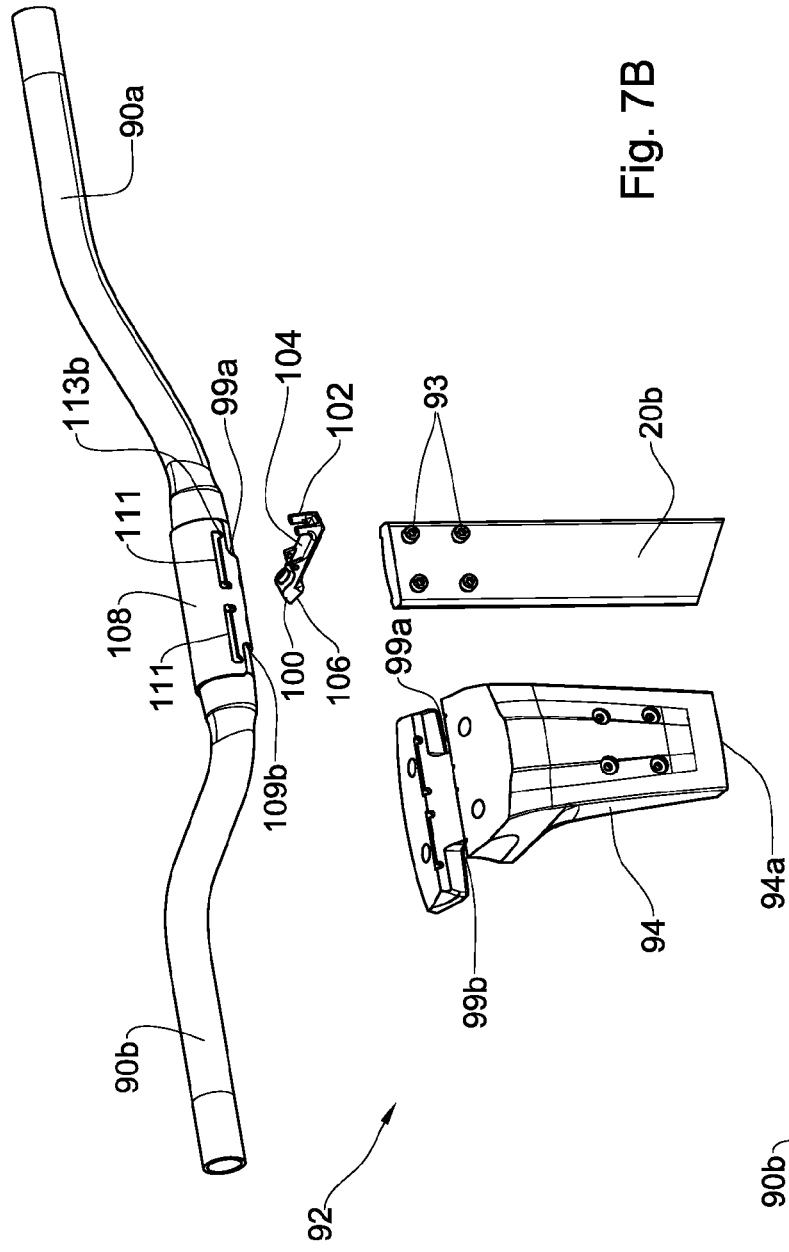
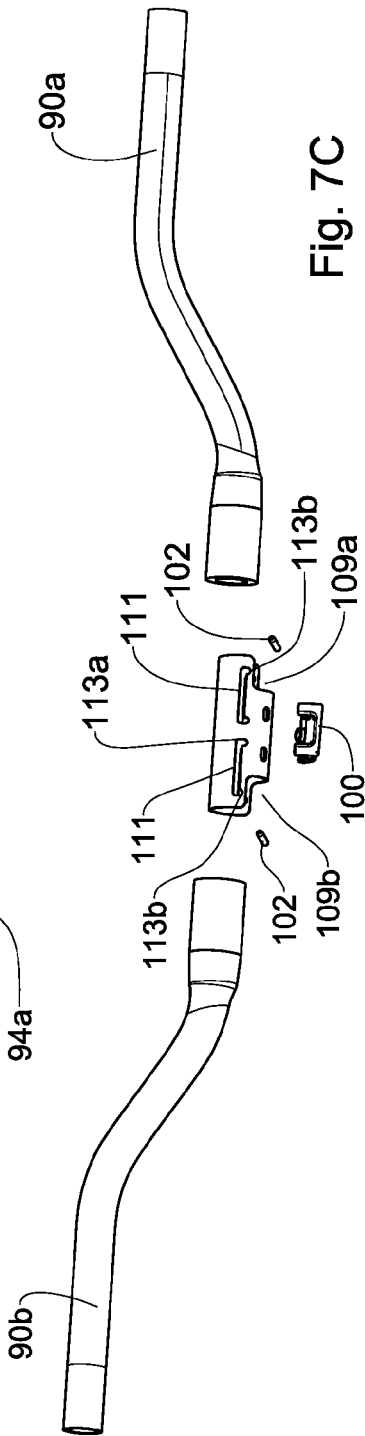

URBAN VEHICLE

TECHNOLOGICAL FIELD

The presently disclosed subject matter relates to an urban vehicle in general and in particular to a scooter.

BACKGROUND

Urban vehicles such as scooters are well known and are vastly in use in densely populated cities where transportation is involved heavy traffic and pollution. Scooters and other motorized mini vehicles are configured to allow a single or two riders to travel short distances within the city, usually through paths which are normally are not used by other vehicles.

As for mini vehicles, such as scooters, the typically small dimensions thereof, allows the rider to carry it by hand, when not in use. However, the small dimensions of the vehicle can render it unsafe to ride. Larger vehicles, on the other hand, are hard to store and carry around when not in use.

WO0236419 discloses an electrically driven and collapsible vehicle for local transportation. When collapsed and while being folded up the vehicle remains in vertical position and thus requires little storage space. Folding up and opening are performed either electrically or manually. The device has replaceable modular platforms, and different user profiles for different purposes of use and users can be programmed in a trip computer. The device can be driven by a person who is either sitting, standing up or walking beside it.

WO03055737 discloses an apparatus and a method for collapsing a means of transport from running position into storage position or vice versa. Collapsing is preferably performed using an electric motor or by hand, the mutual movements of the front part frame, the rear part frame and the reversible rod being preferably synchronised using cogged belt pulleys and the reversible rod. Owing to synchronisation, the centre of gravity of the transport means is stable and remains within an area defined by the wheels during the entire collapsing operation, so that collapsing takes place completely without any external support.

GENERAL DESCRIPTION

According to the present invention there is provided a scooter comprising a deck portion mounted on a pair of front wheels; at least one tail portion foldably coupled to the deck portion and being narrower than the deck portion and mounted on at least one rear wheel thereby providing the deck portion with stability. The scooter further includes a steering post coupled to the front wheels and being foldable with respect to the deck portion.

The term 'scooter' as used herein the specification and claims is used to denote any of a variety of vehicles, urban vehicles, scooters, motorized scooters, moped, etc or any transportation device operated with wheels for carrying one or more riders.

The tail portion can be mounted on the back of the deck portion and can be configured to provide stability thereto with respect to side movements and inclinations thereof. The disposition of the rear wheel and the front wheels can be such that an imaginary triangle is formed therebetween and such that a rider can stand on the deck portion while at least the majority of his feet are positioned between the sides of the imaginary triangle.

The scooter can further include a tail folding mechanism for shifting the tail portion between a folding position and a deployed position; and a steering post folding mechanism for shifting the steering post folding between a folding position and a deployed position. Accordingly, in the folding position the scooter is configured to be carried and in the deployed position the scooter is configured for riding thereon.

In the folding position the scooter can be configured to be carried as a trolley carrier and can be configured to be carried on the front wheels. In addition, in the folding position the steering post can be configured to serve as a trolley carrier handle for vertical movement of the scooter.

The length of the tail portion can be smaller than the length of the deck portion, and in a folding position the entire length of the tail portion can be folded adjacent the deck portion. In a deployed position the entire length of the tail portion can be disposed at the back of the deck portion In addition, any one of the following features may apply to the present invention:

The deck portion can comprise a compartment for inserting therein at least a portion of the tail portion in the folding position.

The compartment can be configured to hold the entire rear wheel in the folding position.

The folding mechanism can include a locking mechanism for selectively locking the tail portion in the folding position and in the deployed position.

The scooter can further comprise a motor for operating the front wheels, and a power source mounting seat configured for receiving a power source of different weights for powering the motor.

The steering post can further includes two handle bars foldably mounted on the steering post.

The deck portion can be formed with a monocoque chassis.

The handle bars can be pivotally mounted to the steering post and can be configured to shift between a deployed position in which the handle bars are horizontally disposed and extend sidewardly with respect to the steering post and a folded position wherein the handle bars are vertically disposed.

The steering post can further include a handle mount having a channel horizontally disposed with respect to the steering post, and can be configured for seating therein the handle bars; the channel can include two depressions each formed at one side thereof, allowing the handle bars to be pivoted downwardly therethrough.

The two handle bars can be pivotally mounted on a pivoting member pivotally mounted on the steering wheel, wherein the handle bars can be configured to shift between a deployed position in which the pivoting member upwardly extend with respect to the steering post and a folded position wherein the pivoting member downwardly extends and wherein the handle bars are disposed at a lower height with respect to the height thereof in the deployed position.

In the folded position the handle bars can be configured to serve as a trolley carrier handle for vertical movement of the scooter.

The scooter can further comprise fastening means for fastening the steering post in the folded position so as to preclude undesirable steering of the front wheels. The scooter of any one of the preceding claims wherein the tail portion includes a shock mitigating element longitudinally disposed and configured to mitigate movements of the rear wheel.

The tail portion can be mounted one an axel mounted on the deck portion, and can include a shoulder member extending upwardly along the width thereof and configured to bear against a bridge member provided on the deck portion for precluding an upward rotation of the tail portion.

The scooter can further include a mitigating member provided between the shoulder member and the bridge member, so as to mitigate the movement of the tail portion with respect to the deck portion.

The tail folding mechanism and the steering post folding mechanism can be configured to be operated in a one action mechanism.

The tail folding mechanism and the steering post folding mechanism can be mechanically coupled to one another and are further provided with an actuator for activation thereof. Alternatively, the one action mechanism can include a first motor provided with the tail folding mechanism and a second motor provided with the steering post folding mechanism configured to operate the folding thereof, and further provided with an automatic system controlling the operation of the first and second motors.

The handle bars can be provided with a third motor for folding thereof, the third motor being controllable by the automatic system. The automatic system can be remotely actuated by a remote control.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 7B is an exploded view of the steering post of FIG. 7A;

FIG. 7C is an exploded view of the handle bars of the steering post of FIG. 7A;

DETAILED DESCRIPTION OF EMBODIMENTS

Figure 1A:
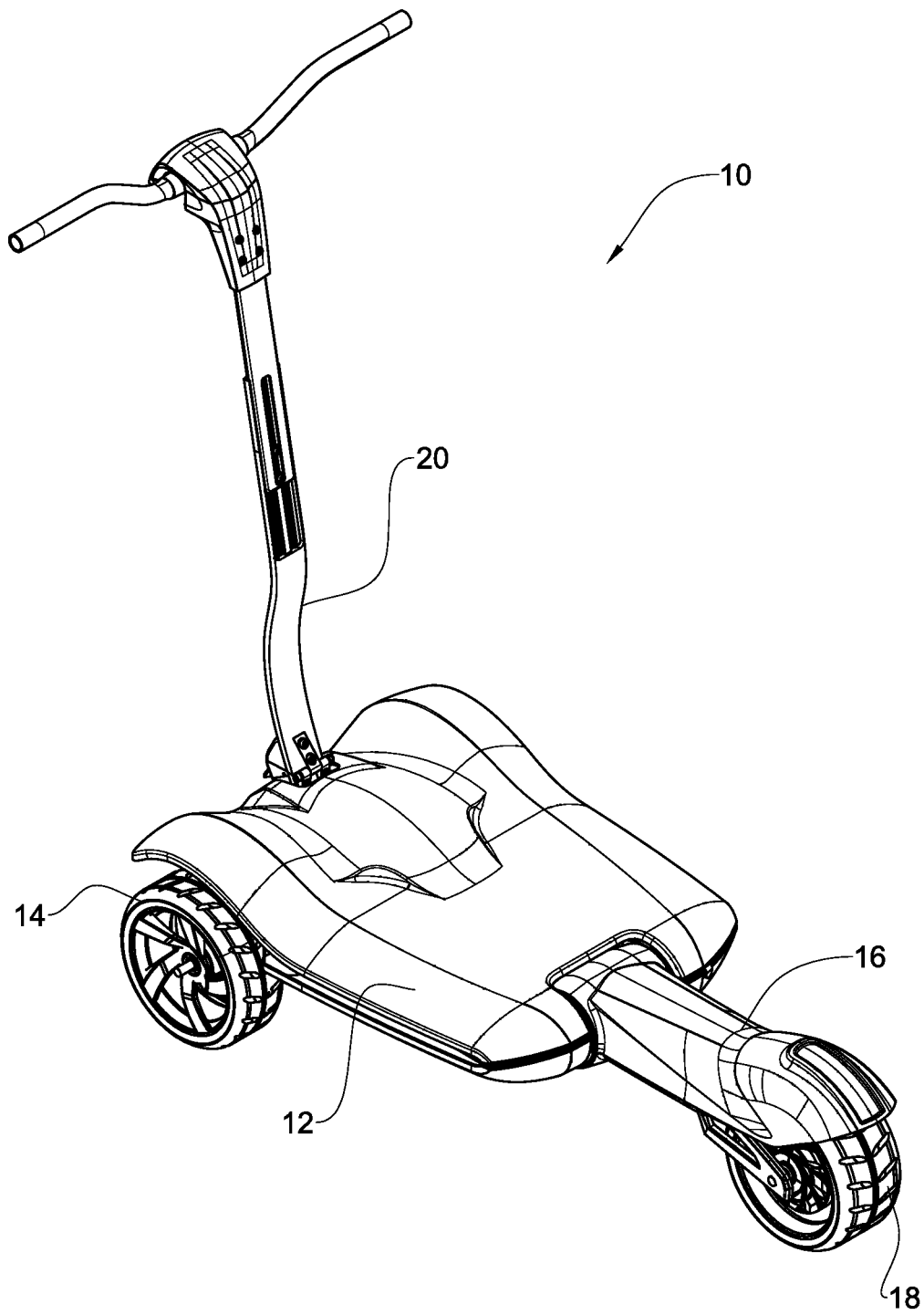
FIG. 1A is a perspective view of the scooter of the presently disclosed subject matter in the deployed position.
Figure 1B:
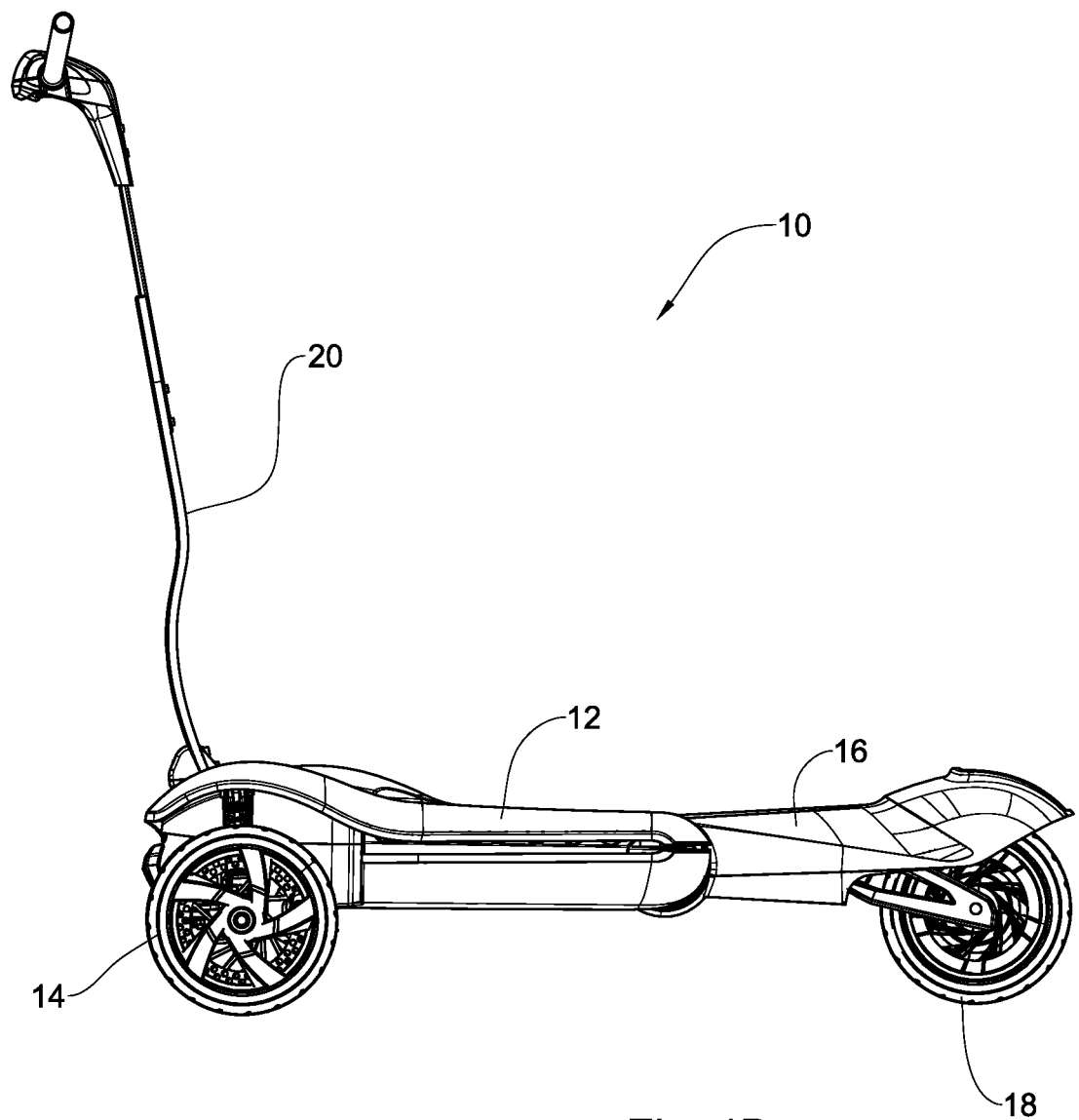
FIG. 1B is a side view of the scooter of FIG. 1A.
Figure 1C:
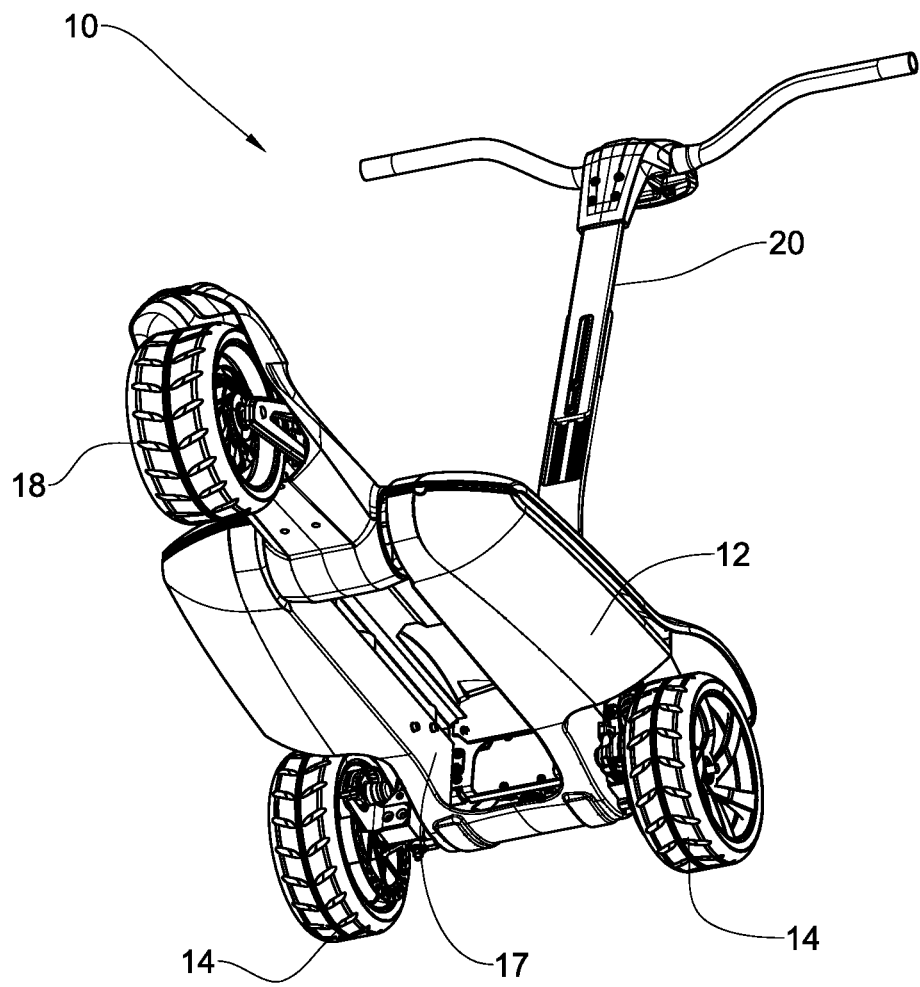
FIG. 1C is a bottom perspective view of the scooter of FIG. 1A.

FIGS. 1A to 1C illustrates a scooter generally designated 10 having a deck portion 12 mounted on a pair of front wheels 14, and a tail portion 16 mounted on at least one rear wheel 18, and a steering post 20 coupled to the front wheels 14. The front wheels 14 can be positioned underneath the front of the deck portion 12 one on each side thereof. According to other examples, the front wheels 14 can be positioned one on each side of the deck portion 12, the front thereof, or any other location about the deck portion. It is appreciated that the location of the front wheels 14 with respect to the deck portion 12 is determined in accordance with the required stability, the size of the wheels and the steering mechanism coupling the steering post 20 with the front wheels 14. In addition, since the disposition of the front wheels 14 with respect to the body of the deck portion 12 can be determined such that in the folded position, shown in FIGS. 9a to 9D, the front wheels are used for carrying the scooter as a trolley carrier.

Figure 1D:
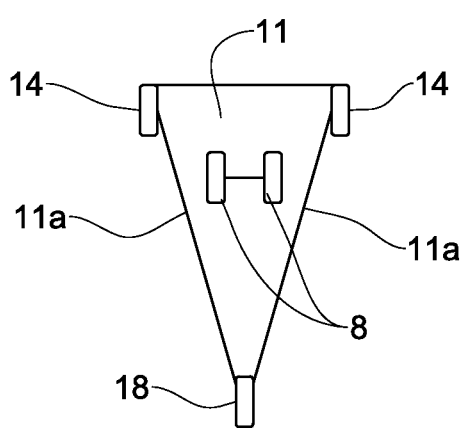
FIG. 1D is a schematic illustration of the position of the wheels of the scooter of FIG. 1A.

The tail portion 16 is configured to provide the scooter with stability with respect to the side movements and inclinations thereof. Thus the tail portion is narrower than the deck portion in is configured only for providing stability and not for standing thereon. The tail portion 16 in this example is positioned at the back of the deck portion 12, thus an imaginary triangle 11 (shown in FIG. 1D) is formed between the two front wheels 14 of the deck portion and the rear wheel 18 on the tail portion. The tail portion 16 has a length such that the rider can stand on the deck portion 12 while his feet 8 are positioned between the sides 11a of the imaginary triangle. In other words, the distance of the rear wheel 18 from the front wheels 14, namely the length of the sides 11a, determines the distribution of the weight of the scooter and the rider over the imaginary triangle 11. However, in order to allow convenient storage and facilitate carrying the scooter when not in use, the tail portion 16 is foldably coupled to the deck portion 12, such that in the folded position the tail portion is folded with respect to the deck portion and in the deployed position the scooter 10 provides a stable ride thereon.

The length of the tail portion can be smaller than the length of the deck portion, such that in the folding position the entire length of the tail portion can be folded adjacent the deck portion. In a deployed position the entire length of the tail portion can be disposed at the back of the deck portion.

Accordingly, the length of the tail portion 16 can be determined in accordance with the required stability of the scooter, the weight limit, and the required size thereof in the folded position.

According to the illustrated example the tail portion 16 is pivotally coupled to the deck portion 12, as explained hereinafter, thus, folding thereof is carried out by pivoting the deck portion to the folded position, as shown in FIGS. 9A to 9D. As shown in FIG. 1C, the deck portion 12 according to this example, includes a compartment 17 having an opening from the bottom of the deck portion, such that in the folded position the tail portion 16 is pivoted downwardly and inserted into the compartment. Alternatively, the compartment 17 can be formed with an opening facing the upper side of the deck portion 12, such that the tail portion 16 can be inserted therein by pivoting the tail portion upwardly.

Alternately, folding the tail portion 16 with respect to the deck portion 12 can be carried out by sliding thereof into a storage compartment inside the deck portion 12.

According to one example, the tail portion 16 can include two tail portions extending rearwardly or sidewardly each having one or more wheels. The tails portions can be foldable with respect to the deck portion 12 in any known fashion. According to one example the tails can extended sidewardly from the deck portion 12 in an angle with respect thereto, thus further increasing the distance between the front wheels on the deck portion and the rear wheel on the each one of the tails, and achieving more stability to the deck portion.

The front and rear wheels 14 and 18 can be selected in accordance with the intended use of the scooter. For example, the width of the tire, and the radius of the wheel can be selected in accordance with the expected maximum speed of the scooter, the areas on which the scooter is intended to be used, etc. It is appreciated that the rear wheel 18 can be different than the front wheels 12, so long as the required stability is provided to the deck portion.

Figure 2A:
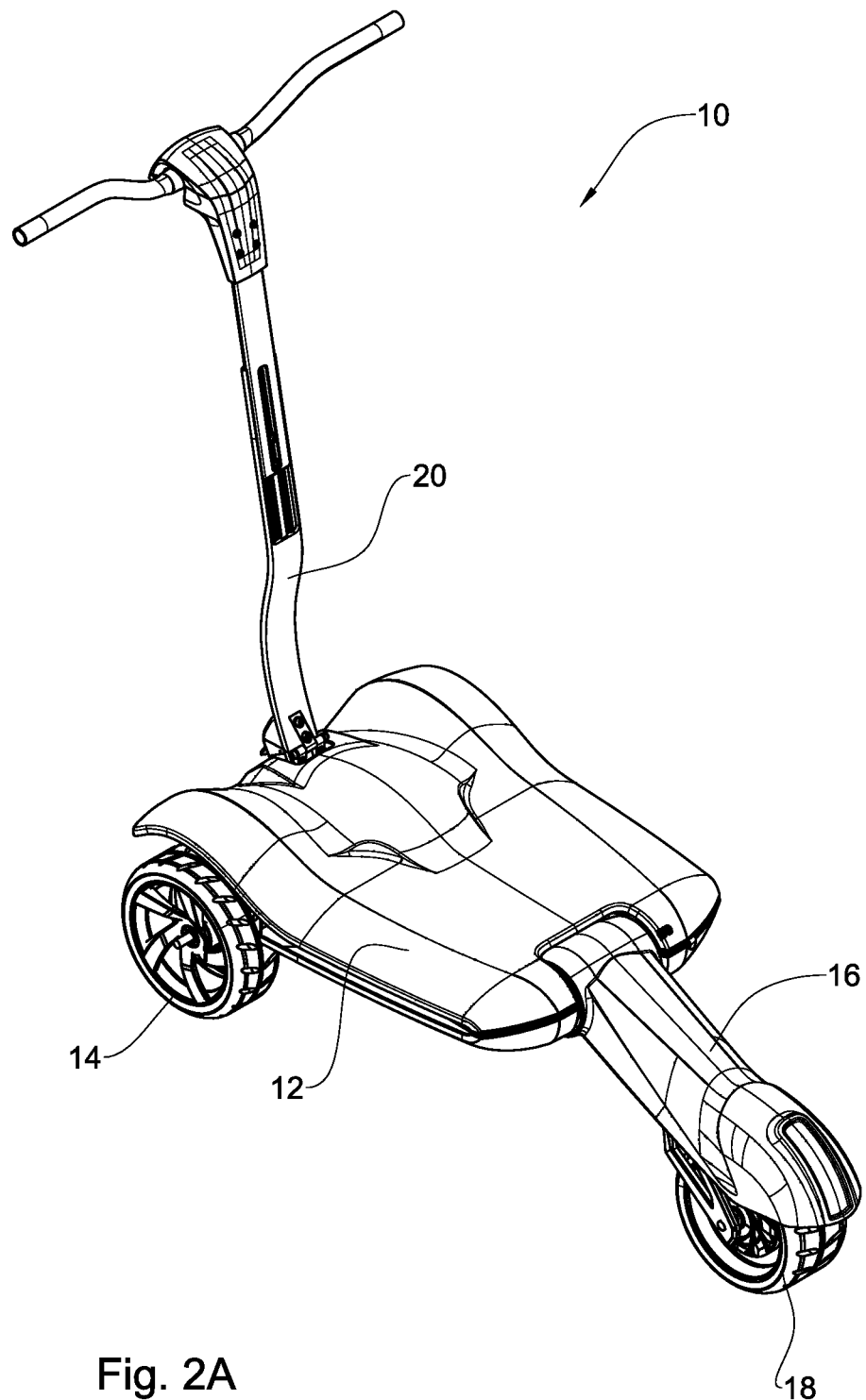
FIG. 2A is a perspective view of the scooter of FIG. 1A with the tail portion partially folded.
Figure 2B:
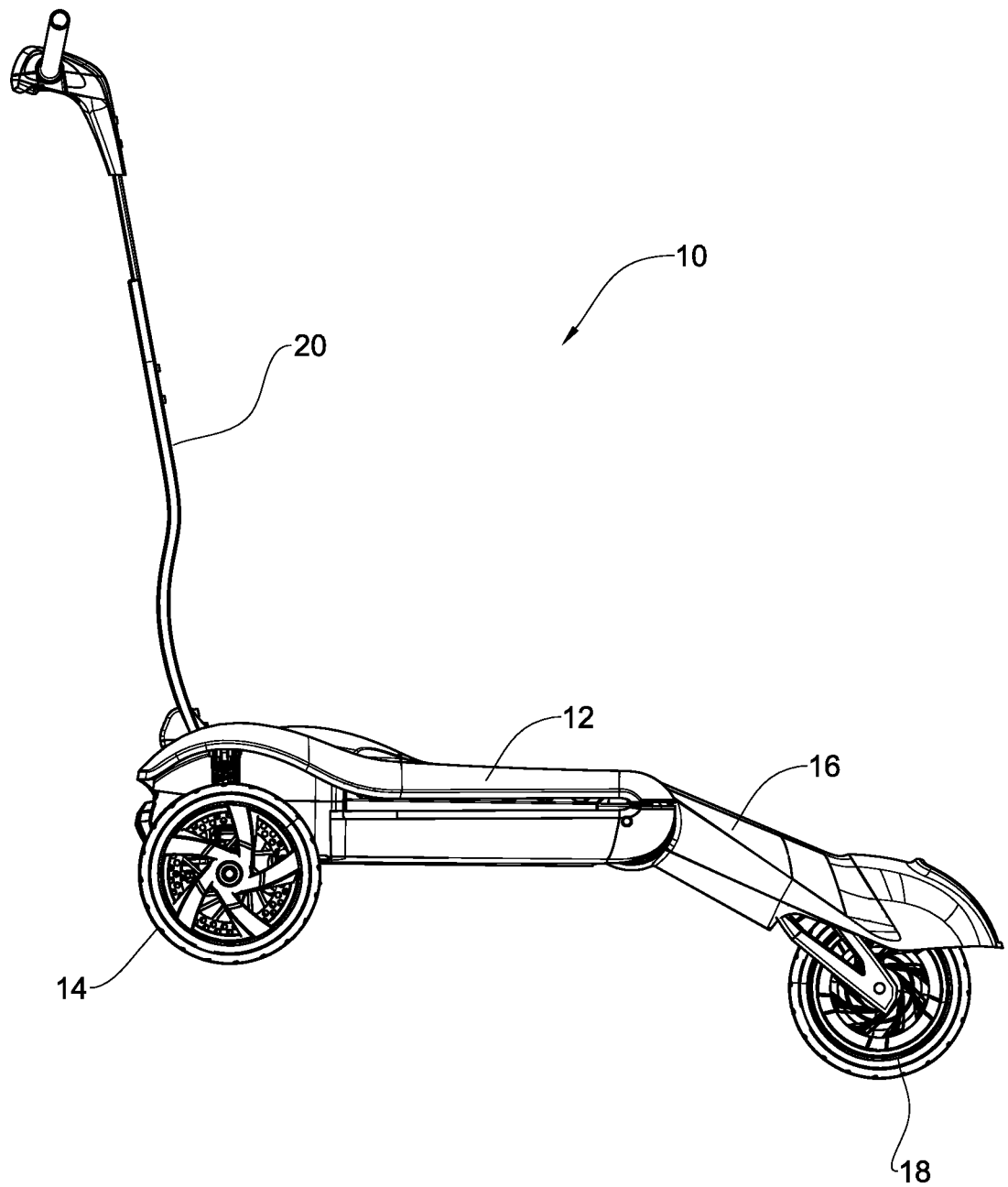
FIG. 2B is a side view of the scooter of FIG. 2A.
Figure 2C:
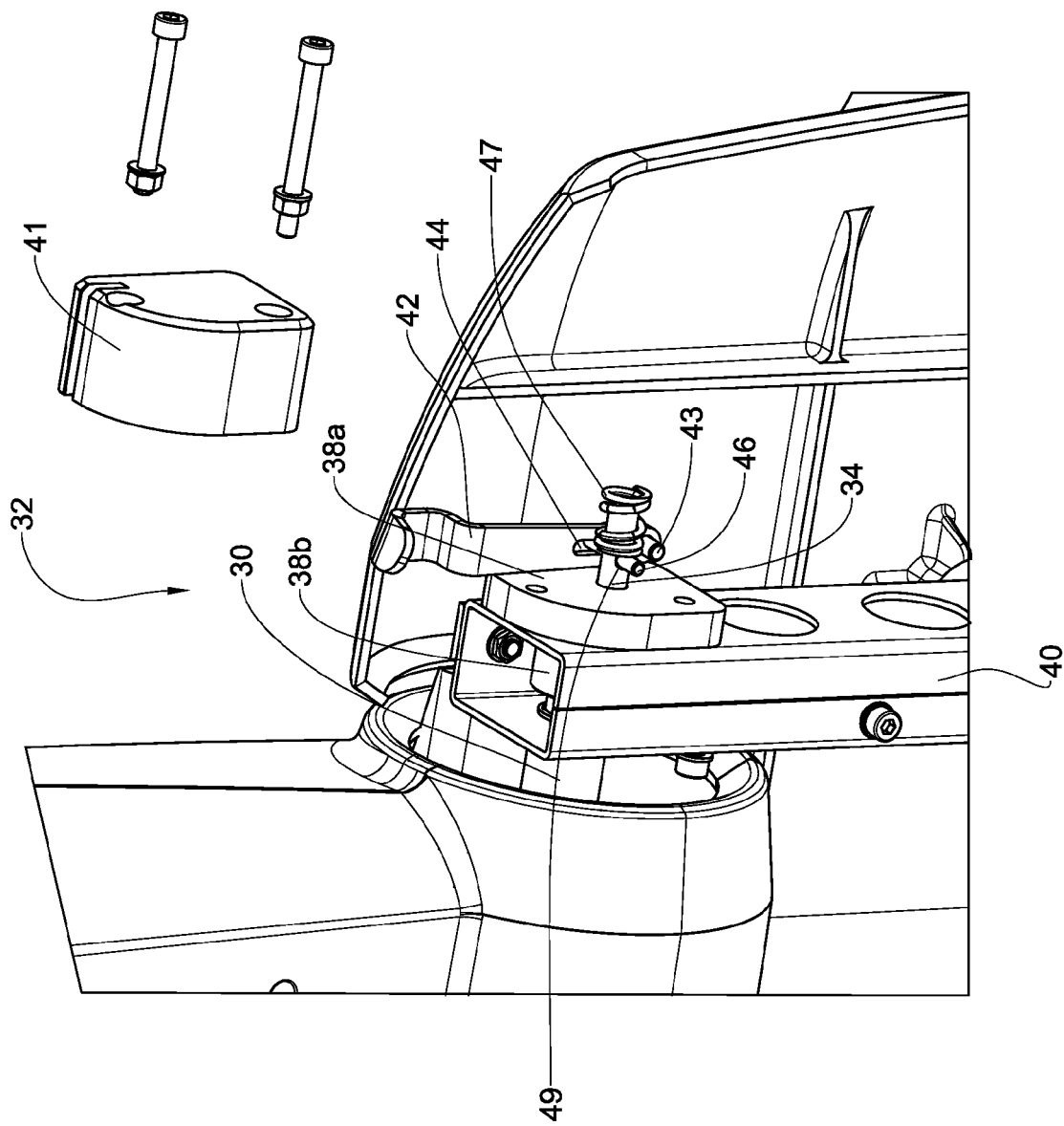
FIG. 2C is a bottom view of the release mechanism of the tail portion of the scooter of FIG. 1A in the locking position.
Figure 2D:
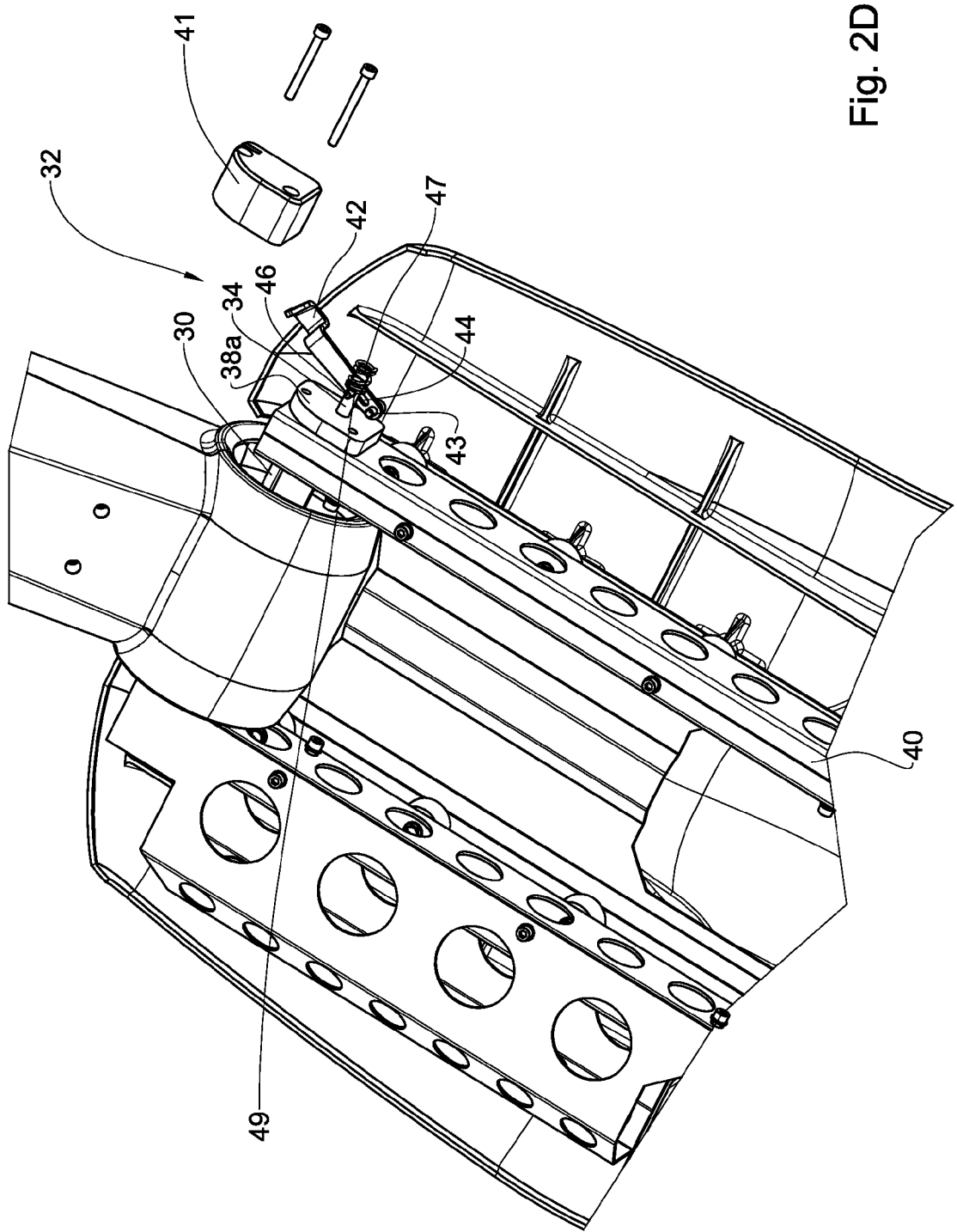
FIG. 2D is a bottom view of the release mechanism of FIG. 2C in the released position.
Figure 3:
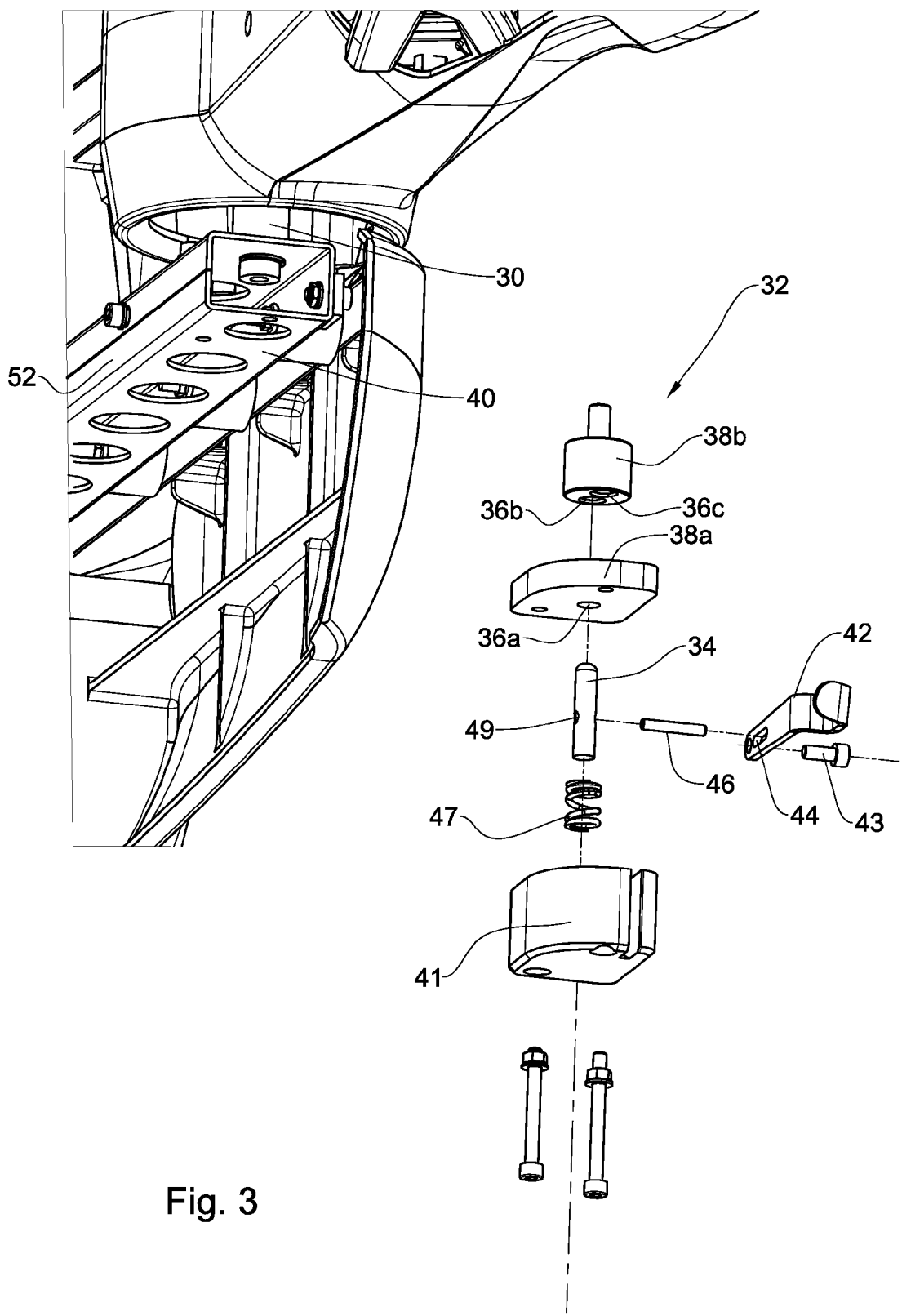
FIG. 3 is an exploded view of the release mechanism of FIG. 2D.

Turning now to FIGS. 2C through 3 the tail portion 16 is mounted on the chassis 40 of the deck portion 12 and include a tail folding mechanism for shifting thereof between a folding position and a deployed position. This can be carried out for example by means of an axel 30 about which it can be pivoted downwardly into the compartment 17.

In order to preclude an undesirable pivoting of the tail portion 16, in the deployed position, the axel 30 is provided with an axel locking mechanism 32. The locking mechanism 32 includes a locking pin 34, a bracket 38a fixedly mounted on the chassis 40 and a rotating bracket 38b mounted on the axel 30. The locking pin 34 is disposed in an aperture 36a defined in the bracket 38a, and selectively extends in and out of an aperture 36b defined in the rotating bracket 38b. In order to preclude rotation of the axel 30, the apertures 36a and 36b and thus the locking pin 34, are disposed in an axis which is different than the axis of the axel 30. When the locking pin 34 is disposed in the aperture 36a of bracket 38a, as well as in the aperture 36b of the rotating bracket 38b the locking pin 34 does not allow the rotation of the axel 30.

As shown in FIG. 2D, the locking pin 34 can be selectively pulled out of the aperture 36b of the rotating bracket 38b, into the unlocking position of the axel 30, thereby allowing the axel 30 and the rotation bracket 38b to freely rotate about the axis of the axel. Pulling the locking pin 34 out of the aperture 36b can be carried out by a release handle 42 coupled to the locking pin. According to the illustrated example the release handle 42 is pivotally mounted on a hinge 43, and includes a groove 44. The locking pin 34 includes a transverse pin 46 transversely coupled to the locking pin, for example disposed in a transverse bore 49 defined therein. One side of the transverse pin 46 is slidingly disposed inside the groove 44. Thus, when the handle 42 is pushed to the side, away from the rotating bracket 38b, the transverse pin 46 is pulled therewith, thereby pulling the locking pin 34 out of the aperture 36b of the rotating bracket.

The locking pin 34 can further include a spring 47 mounted thereon and bearing against the transverse pin 46, such that when the handle 42 is pushed sidewardly, and the transverse pin 46 together with the locking pin 34 are pushed away from the aperture of the rotating bracket 38b, the spring 47 urges the transverse pin 46 back to its place, and consequently the locking pin slides back into the aperture 36b. This way, the user can pushed the handle 42 sidewardly thereby releasing the axel 30 and allowing the tail portion 16 to be rotate thereabout. The handle 42 is urged back into the locking position of the axel 30 by the spring 47.

It is appreciated that once the tail portion 16 is free to rotate, the rotating bracket 38b is rotated therewith and thus the aperture 36b defined thereon is no longer aligned with the aperture 36a of the bracket 38a, hence in this position the locking pin 34 cannot be inserted therein. However, the rotating bracket 38b can include a second aperture 36c (shown in FIG. 3) defined such that when the tail portion 16 is disposed inside the compartment 17 the second aperture 36c on the rotating bracket is aligned with the aperture 36a on the bracket 38a and the locking pin 34 can be inserted therein, thereby locking the axel 30. This way, the locking mechanism 32 allows locking the axel 30 in the deployed position of the tail portion 16, by inserting the locking pin 34 into the aperture 36b, and further locking the axel in the folded position of the tail portion by inserting the locking pin into the second aperture 36c. A locking mechanism cover 41 can be further provided so as to preclude finger trap in the locking mechanism 32. According to the illustrated example the cover 41 also serve as a bearing member for the spring 47 mounted on the locking pin 34.

Figure 4A:
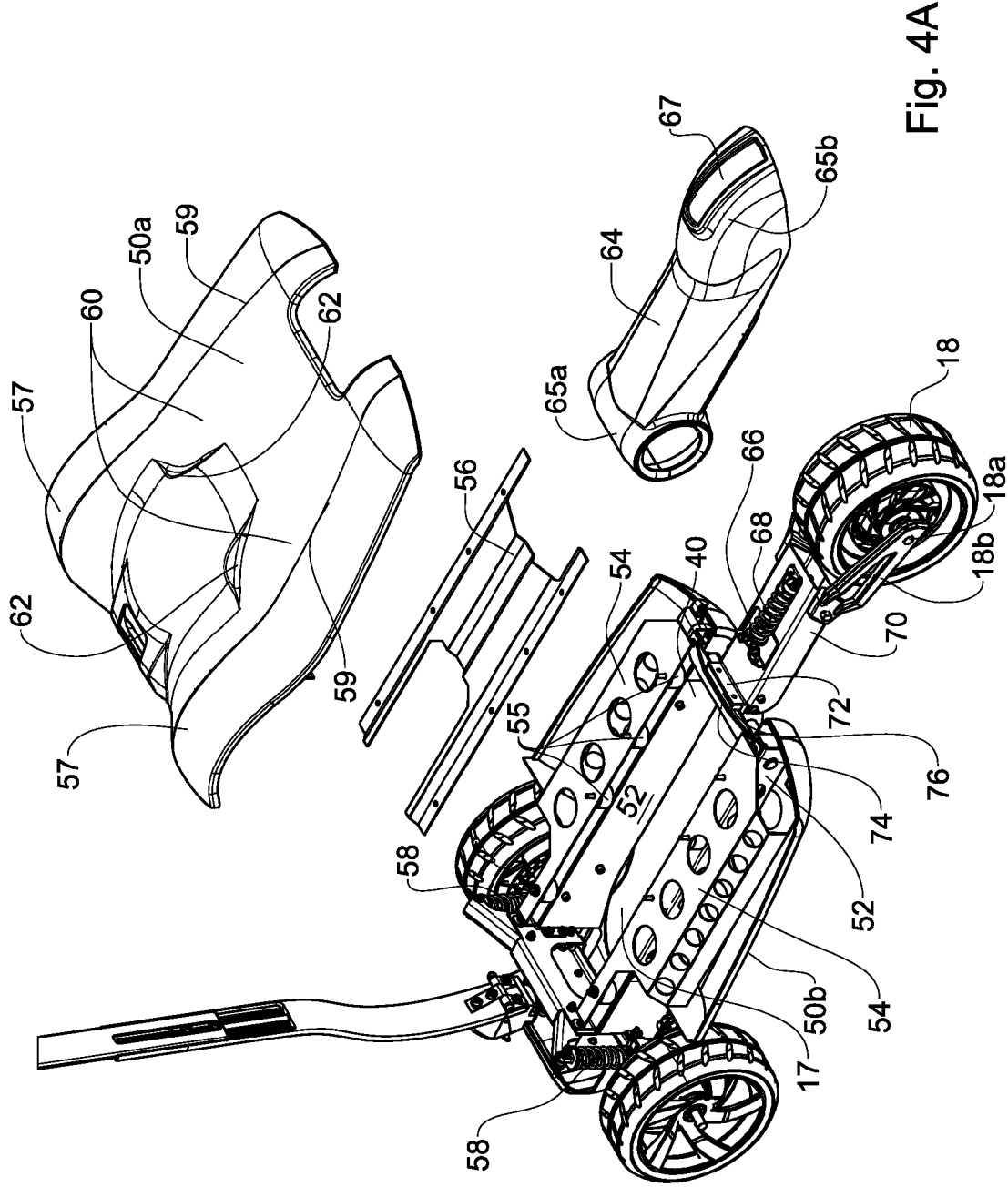
FIG. 4A is an exploded view of the scooter of FIG. 1A.
Figure 4B:
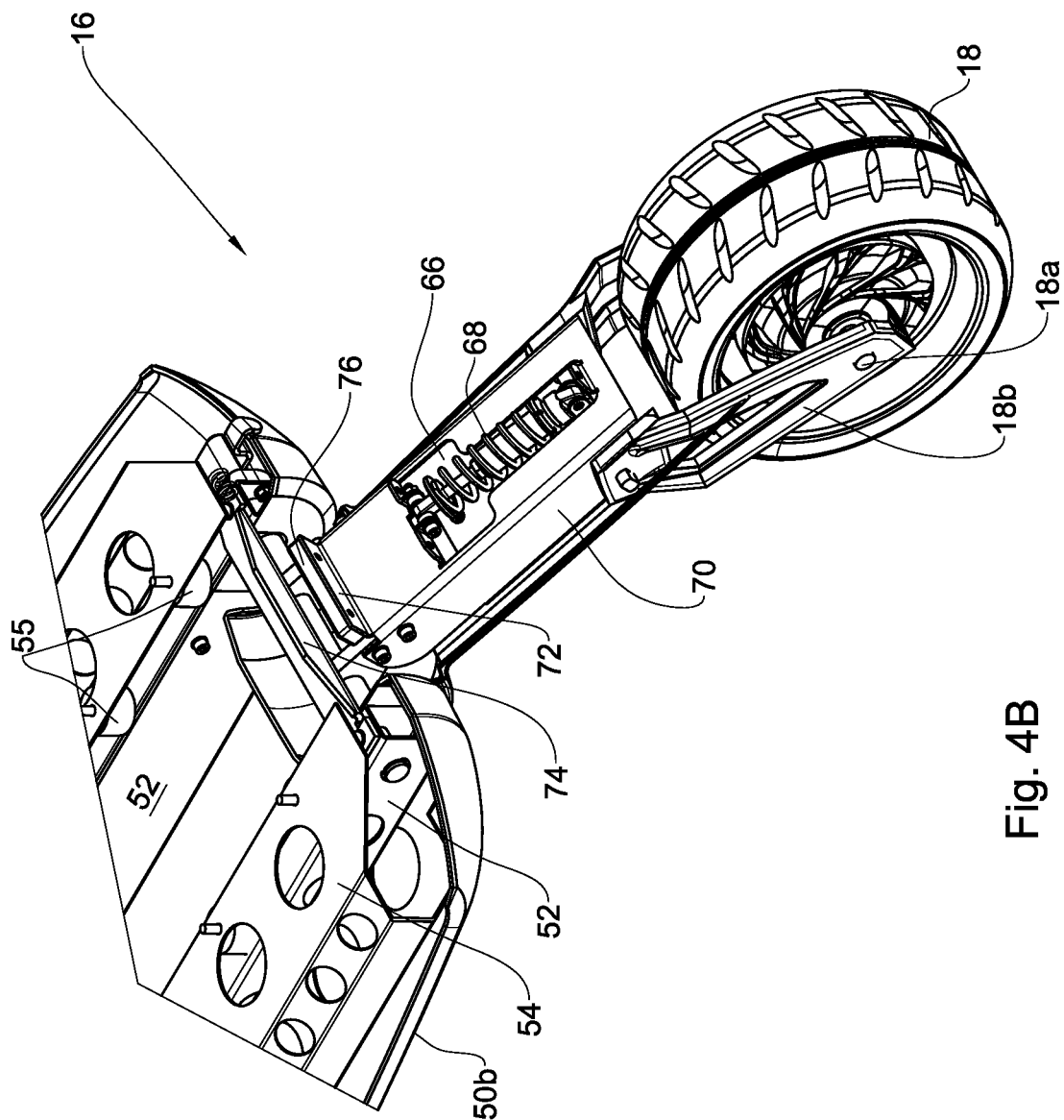
FIG. 4B is an exploded view of the scooter of FIG. 1A with the tail portion partially folded.

Attention is now directed to FIGS. 4A and 4B, the deck portion 12 includes an upper cover 50a, and bottom cover 50b and a chassis 40 having two longitudinal posts 52 defining a space therebetween. The space between the two longitudinal posts 52 can serve as the aforementioned compartment 17 for the tail portion 16 in the folded position. Each post 52 includes a supporting frame 54 mounted thereon configured to support the sides of the upper and bottom covers 50a and 50b. A shock absorbing mechanism can be further provided, for example in the form of a plurality of rubber cylinders 55 mounted between each longitudinal post 52 and the respective supporting frame 54. The absorbing mechanism can be configured to mitigate the trembling caused when the scooter travels on a rough surface.

In order to further support the feet of the rider standing on the upper cover 50a, specifically in the area thereof disposed on top of the space between the two longitudinal posts 52, a support member 56 can be provided.

According to this example, the front wheels 14 are mounted on the chassis 40, at the side of the longitudinal posts 52, thus can be used to carry the scooter as a trolley carrier when in the folded position. The front wheels 14 can further include a shock absorbing element, such as mitigating springs 58, as known. The upper cover 50a includes an elevated portion 59 on each side thereof, and two wheel protecting portions 57 each partially covering one of the front wheels 14. The upper cover 50a can further include two feet griping areas 60, one for each foot of the rider. The feet gripping areas 60 can be an area delimited by the elevated portions 59 on the side thereof and by shoulder portions 62 defined at the front thereof. This way, the rider can place his foot on the foot gripping area and the shoulder portion 62 as well as the elevated portion 59 preclude the displacement of the rider's foot, for example while traveling over bumps. The feet griping areas can include an antiskid surface, such which has a plurality of grooves and ridges, for increasing the friction with the rider's shoe.

According to another example, the deck portion is formed with a monocoque chassis, for example made from a reinforced plastic. According to this example the entire chassis with the supporting frame, the supporting member and the upper and lower covers can be formed as a unified body.

The tail portion 16 includes a tail cover 64, having an axel cover portion 65a and a wheel cover portion 65b, which can include a reflector or a rear light 67. The tail portion 16 further include a shock mitigating element 66, such as having a spring 68 longitudinally disposed and configured to mitigate movements of the rear wheel 18. The shock mitigating element 66 can be mounted on a tail frame 70 on one end thereof and coupled to the rear wheel axel 18a on the other end thereof. Coupling the rear wheel axel 18a to the shock mitigating element 66 can be carried out by means of one or two arms 18b extending from the axel toward the tail frame 70, and coupled to the rear absorbing element.

In order to preclude upward rotation of the tail portion 16 with respect to the deck portion 12, the tail frame 70 can be provided with a shoulder member 72 extending upwardly along the width of the frame on the edge thereof facing the deck portion. The shoulder member 72 is configured to bear against a bridge member 74 mounted between the longitudinal posts 52 of the chassis 40 above the axel 30. A mitigating member 76 can be provided between the shoulder member 72 and the bridge member 74, so as to mitigate the movement of the tail portion 16 with respect to the deck portion 12.

Figure 5A:
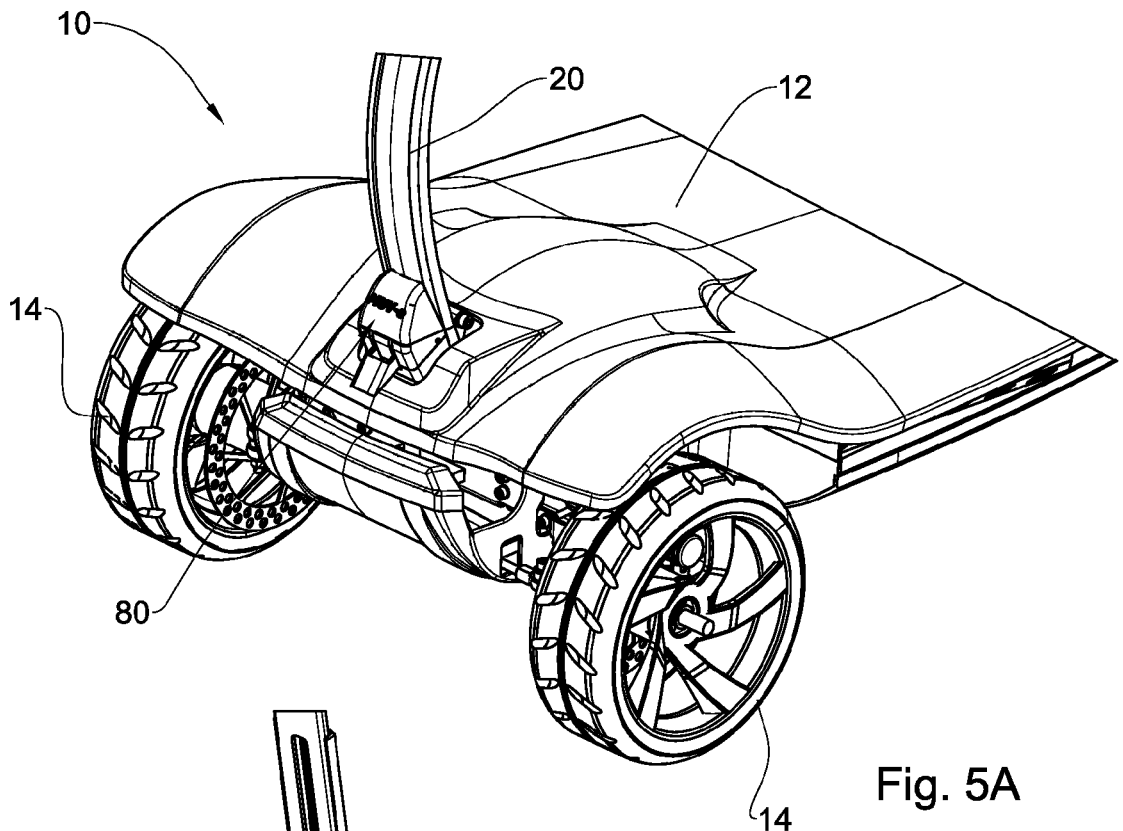
FIG. 5A is a front perspective view of the front portion of the scooter of FIG. 1A.
Figure 5B:
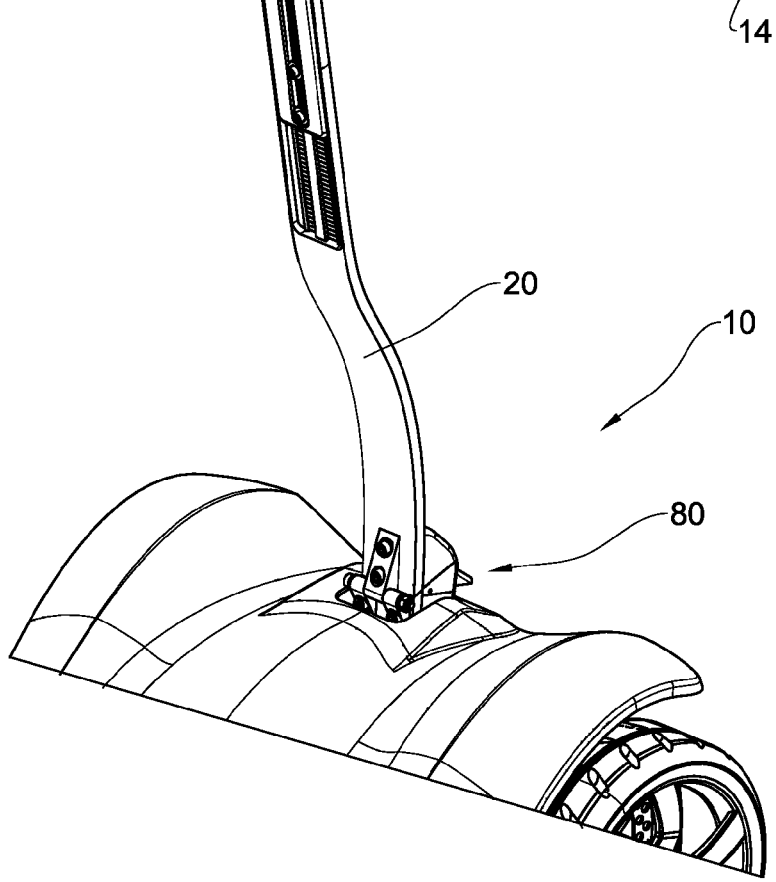
FIG. 5B is a rear perspective view of the front portion of the scooter of FIG. 1A.
Figure 5C:
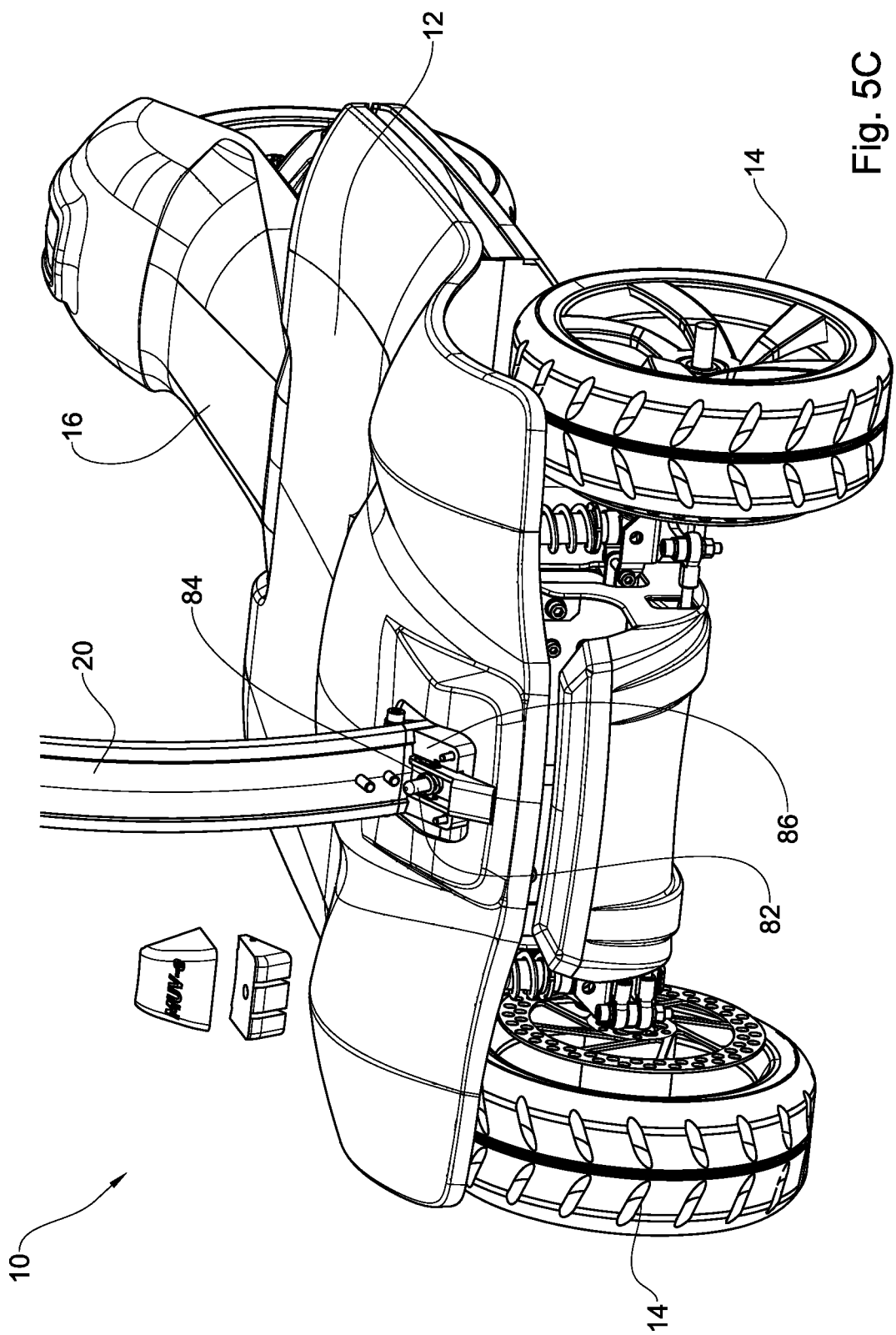
FIG. 5C is an exploded view of the steering locking mechanism of the scooter of FIG. 1A.

Turning now to FIGS. 5A through 5C, the steering post 20 is foldable with respect to the deck portion 12, and having a steering post folding mechanism for shifting thereof between a folding position and a deployed position. For example the steering post 20 can include a hinge (not shown) for rotation thereof toward the deck portion 12.

The steering post further includes a steering locking mechanism 80 so as to preclude undesirable rotation thereof with respect to the deck portion 12, for example from the deployed position to the folded position. The locking mechanism 80 can include a locking pin 82 configured to be extended through a bore 84 defined on a locking bracket 86 coupled to the steering post 20. The locking pin 82 which is disposed substantially in parallel to the steering post 20 is further configured to be extended through an aperture formed on a fixed bracket (not shown) mounted on the chassis 40 underneath the steering wheel 20.

The locking pin 82 can be pulled out of the aperture of the fixed bracket by a pivoted handle 88 which can be spring biased. When the locking pin 82 is disposed inside the aperture of the fixed bracket, pivoting the steering wheel 20 is precluded due to the engagement of the locking pin 82 and the fixed bracket. However, when the locking pin 82 is pulled out of the aperture 85 of the fixed bracket by lifting the pivoted handle 88 the steering wheel 20 is free to pivot downwardly towards the deck portion 12.

In the folded position, the steering post 20 can be fastened to the deck portion, for example with a strap (not shown) affixed to the upper cover 50a. Fastening the steering post 20 precludes rotation thereof about its axis and thus precludes undesirable steering of the front wheels 14, which is in particular useful when carrying the scooter as a trolley carrier.

According to an example, the length of the steering post 20 can be adjusted, such that it can fit riders of different heights. According to the illustrated example the steering post 20 included an upper portion 20a and a lower portion 20b adjustably coupled to one another. The lower portion 20b can include a track 21 formed along a portion of the length thereof and the upper portion 20a can be configured to slide in and out of the track 21. The track 21 can further include a plurality of wedge protrusions 22b configured to engage a plurality of corresponding wedges 22a defined on a portion of the upper portion. When the upper portion 20a is disposed in the track 21 of the lower portion 20b the wedges 22a and the corresponding wedges form together a wedgelock arrangement. Thus, the upper portion 20 can be slide up and down along the track 21 in increments of one wedge at a time, until the desired disposition of the upper portion 20a with respect to the lower portion is reached.

Figure 6:
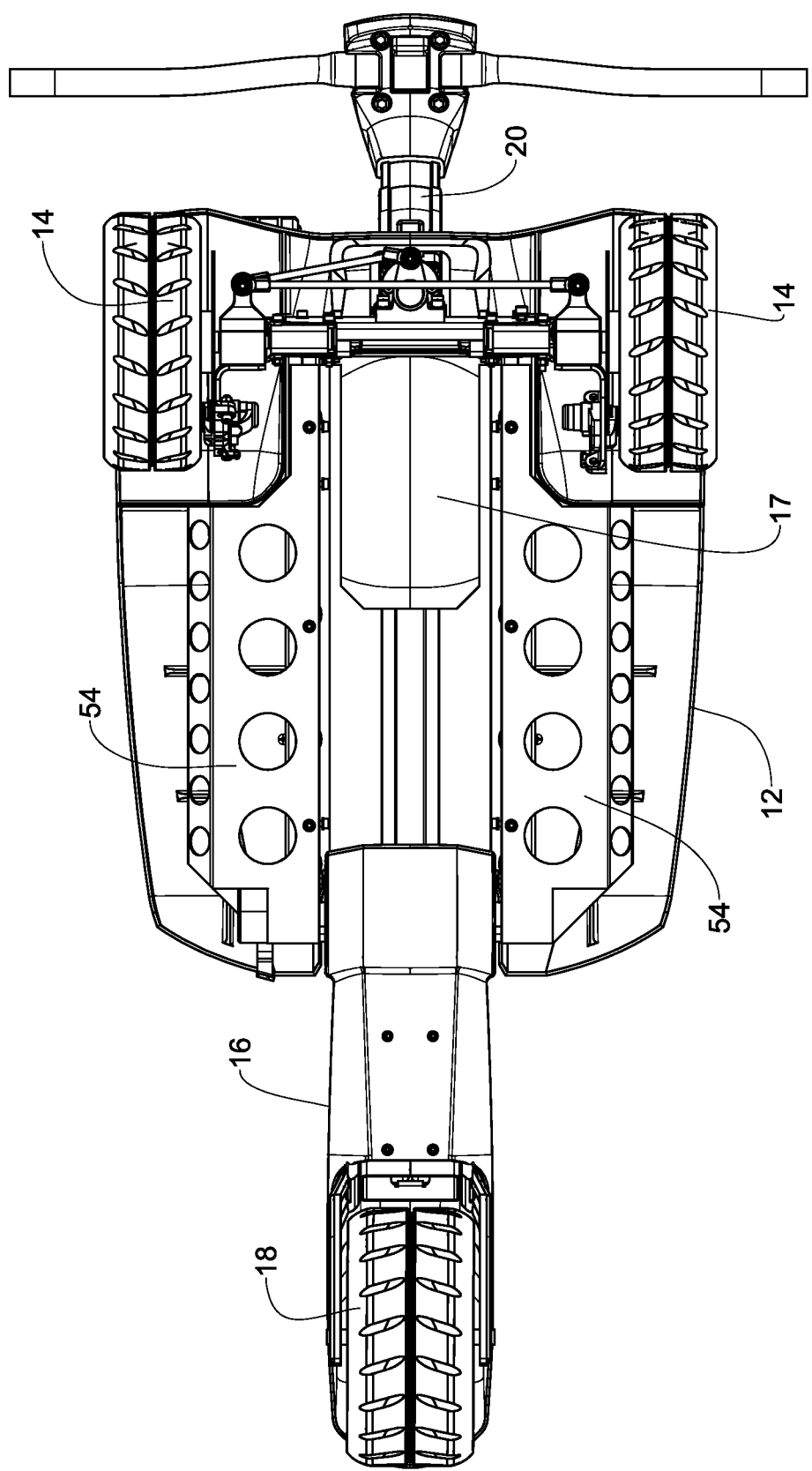
FIG. 6 is a bottom view of the scooter of FIG. 1A.

As shown in FIG. 6 the steering post 20 is coupled a steering mechanism which is configured to steer the front wheels 14 as known. A motor and a breaking system can also be provided and can be operated on one or two of the front wheels 14. It is appreciated that the breaking system and the motor can include two units one for each front wheel 14 and can be disposed inside the inner diameter of the front wheels, so as to minimize the required space therefor.

According to an example, the motor can be operated by a power source, such as a battery, and the scooter can include a power source mounting seat configured for receiving a power source of different weights. This way, the power source, such as the battery, can be selected in accordance with the user's requirements, for example the expected traveling distance between charges of the battery. The power source mounting seat can be such that it can receive batteries of different sizes, so as allow the user to select the desired battery and thus reduce the overall weight of the scooter.

Figure 7A:
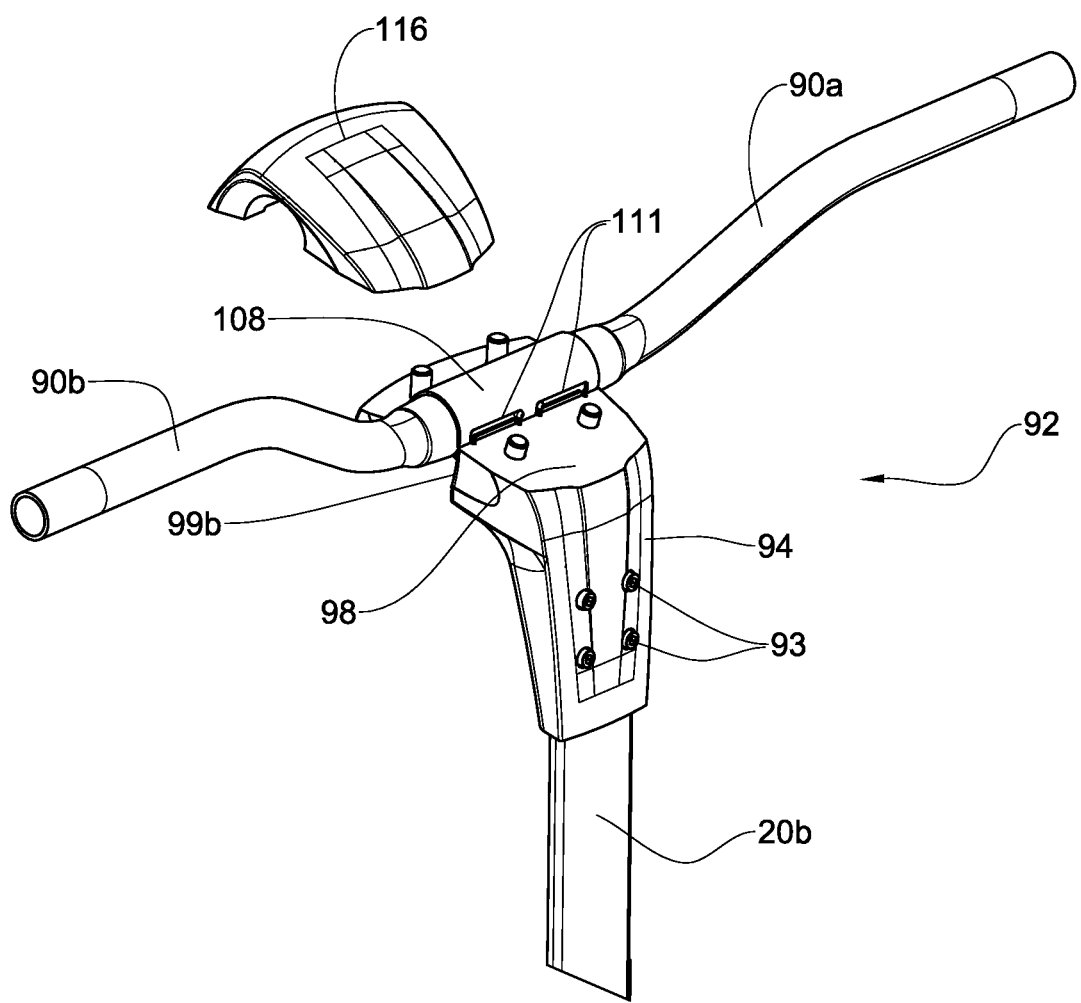
FIG. 7A is a perspective view of the steering post of the scooter of FIG. 1A according to one example of the presently disclosed subject matter.

Referring now to FIGS. 7A through 7C the handle bars 90a and 90b can be coupled to the steering post 20 by a handle mount 92 having a vertical portion 94 for coupling thereof to the upper portion 20b of the steering post. Coupling the vertical portion 94 to the upper portion 20b can be carried out for example by forming a sleeve 94a therein, in which a segment of the upper portion 20b is inserted and fastened by a plurality of bolts 93. The handle mount 92 further includes seating portion 98 having a channel 98a horizontally disposed with respect to the steering post 20, and configured for seating therein the two handle bars 90a and 90b. The circumferential shape of the channel 98a corresponds to the circumferential shape of the handle bars 90a and 90b, so as to ensure a stable coupling when in the deployed position, thus in the illustrated example both the channel and the bars are rounded. The channel 98a further includes two depressions 99a and 99b each formed at one side thereof, allowing the bars 90a and 90b to be folded therethrough as explained hereinafter with reference to FIG. 8.

The handle mount 92 can further include a fastener 100 having two locking pins 102 configured to engage a locking bore 103 formed in each of the handle bars. The fastener 100 includes a press member 106 and a pivot 104 for coupling to the seating portion 98. The pivot 104 is disposed between the locking pins 102 and the press member 106, such that and the press member is pressed toward the bars 90a and 90b the fastener 100 is pivoted and the locking pins 102 are urged in the opposite direction away from the bars 90a and 90b and hence are pulled out of the locking bore 103. The presses member 106 can be spring biased such that when it is not pressed the fastener 100 is pivoted back to its fastening position in which the locking pins 102 are disposed inside the locking bore 103.

The handle bars 90a and 90b are couple to one another and to the handle mount 92 by means of a sleeve 108, having depressions 109a, 109b each formed on one end thereof, corresponding to the depressions 99a and 99b respectively on channel 98a. The sleeve 108 includes apertures 109 for inserting therethrough the locking pins 102 in and out of the locking bores 103 of the bars 90a and 90b. In addition the sleeve includes a retaining arrangement for retaining the bars 90a and 90b in the sleeve 100 in both the deployed and the folded position. The retaining arrangement can include a pair of sliding grooves 111, formed along the length of the sleeve 108 each extending from substantially the center thereof toward one side thereof, in a corresponding location to the location inside the sleeve in which each of the bars 90a and 90b is disposed. Each sliding grooves 111 is formed with a first and a second retaining seat 113a and 113b each transversely disposed at each side thereof. A sliding pin 115 coupled to each of the bars 90a and 90b slides inside the corresponding sliding groove 111, and is configured to be displaced between the two retaining seats 113a and 113b at the two ends of the sliding groove.

Each of the second retaining seats 113b is disposed above the one of the depressions 109a, and 109b of the sleeve 108, such that the sliding pin 115 serves as a pivot about which the corresponding bar can pivot downwardly through the depression 99a and 99b. A cover 116 can be provided to hold the sleeve 108 and the bars 90a and 90b in place with respect to the handle mount 92.

When the bars 90a and 90b are in the deployed position and extend sidewardly, the sliding pin 115 of each bar seats in the first retaining seat 113a which is closer to the center of the sleeve 108.

Figure 8:
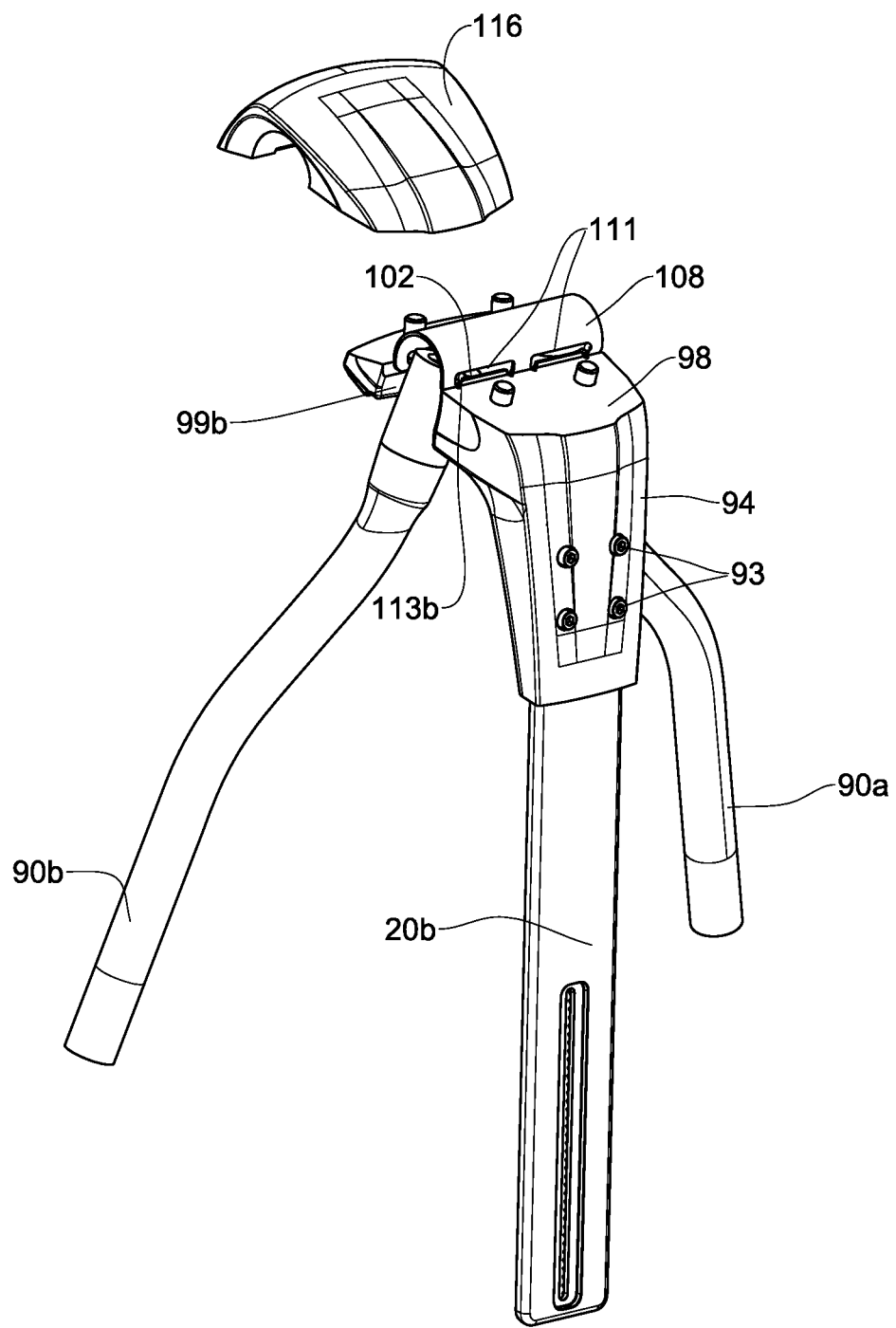
FIG. 8 is a perspective view of the steering post of FIG. 7A in the folded position.
Figure 9C:
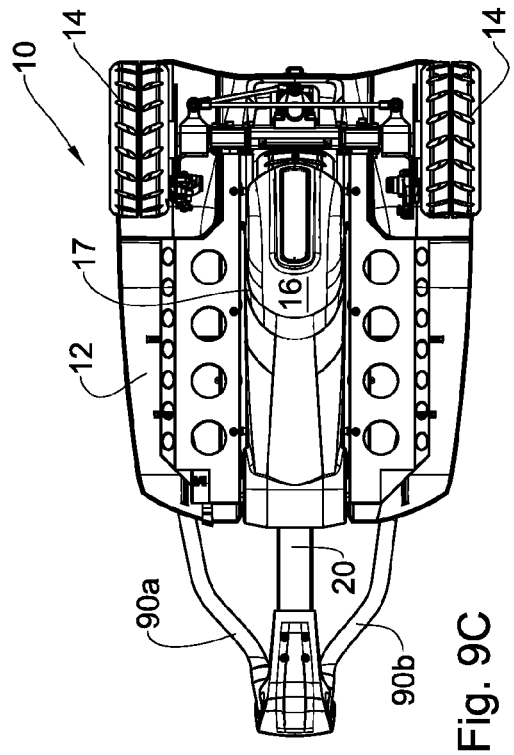
FIG. 9C is a bottom view of the scooter of FIG. 1A in the folded position.
Figure 9D:
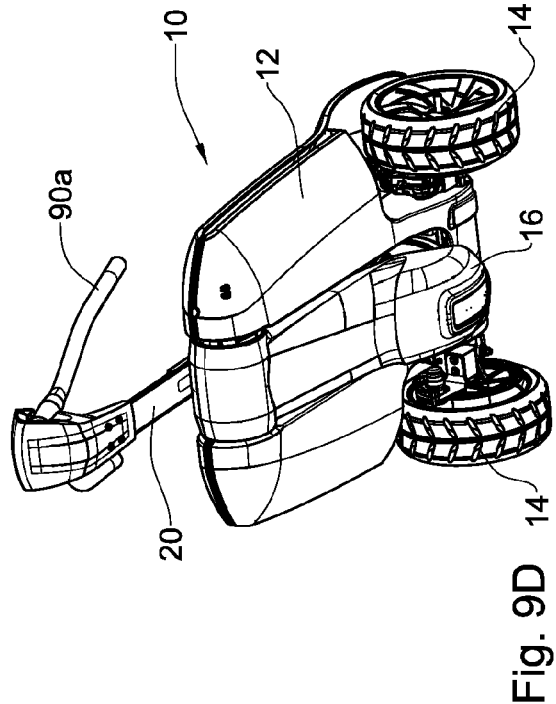
FIG. 9D is a bottom perspective view of the scooter of FIG. 1A in the folded position.
Figure 9A:
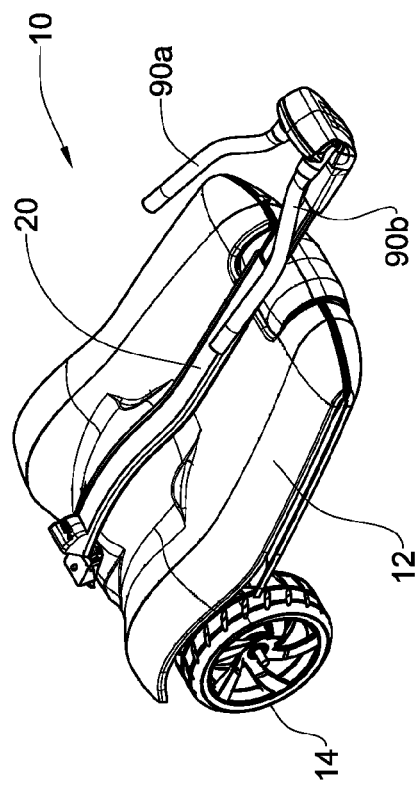
FIG. 9A is a top perspective view of the scooter of FIG. 1A in the folded position.
Figure 9B:
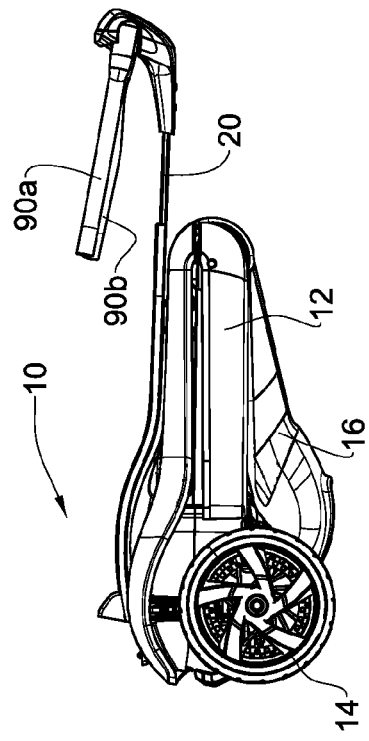
FIG. 9B is a side view of the scooter of FIG. 1A in the folded position.

As shown in FIG. 8, folding the bars 90a and 90b is carried out by inwardly pressing the press member 106 thereby releasing the locking pins 102 out of the locking bores 103 in each of the bars. Now the bars can be slide sidewardly by sliding the sliding pin 115 inside the sliding grove 111 from the first retaining seat 113a to the second retaining seat 113b. In this position, the bars 90a and 90b are folded downwardly through both the depression 109a, and 109b of the sleeve as well as the depressions 99a and 99b formed in the channel 98a. This way, in the folded position the bars 90a and 90b can be vertically disposed substantially parallel to the steering post 20, and the required space to maneuver the scooter 10 is minimized.

As shown in FIGS. 9A through 9D in the folded position of the scooter 10, the tail portion 16 and the steering post 20 are folded with respect the deck portion 12, and the handle bars 90a and 90b are folded with respect to the steering post. The rear wheel 18 of and the tail portion 16 are disposed in the compartment 17 of the deck portion 12.

In the folded position the scooter is folded in a manner which allows it to be carried as a trolley carrier. In addition the handle bars 90a and 90b in the folded position can be configured to allow gripping thereof so as to maneuver the folded scooter as a trolley carrier. In this position the folded handle bars 90a, 90b can be gripped to incline the folded scooter forward and allow a vertical movement thereof by the front wheels 14.

In order to allow vertically disposing the scooter 10 in the folding position thereof, without having to hold the bars 90a, 90b, or without having to horizontally disposed the scooter, a stand member (not shown) can be provided for example at the front end of the upper cover 50a. The stand member together with the front wheels 14 allow vertically standing the scooter in the folded position.

According to one example folding and deploying the scooter can be carried out in a one action folding and deploying mechanism, which controls the folding mechanism 32 of the tail portion 16 the steering locking mechanism 80 and the folding of the handle bars 90a, and 90b. This way the user can activate the mechanism in one action with our having to fold or deployed the tail portion, the steering post and the bars separately. This can be carried out by mechanically coupling the different aforementioned folding mechanisms and providing one actuator, such as a handle for activation thereof.

According to one example folding and deploying the scooter can be carried out by an automatic system controlling the folding mechanism 32 of the tail portion 16 the steering locking mechanism 80 and the folding of the handle bars 90a, and 90b. This can be carried out by providing each of the folding mechanism with a motor controlled by a controller. The automatic system can further control the adjustment of the length of the steering post and in the folding position can slide the upper portion 20a with respect to the lower portion 20b so as to further minimize the space required for the scooter in the folding position. The automatic system can be controlled by an actuator activated directly or remotely actuated from example through a remote control, which can be embedded in the rider's handle held device such as a cellular phone.

Figure 10A:
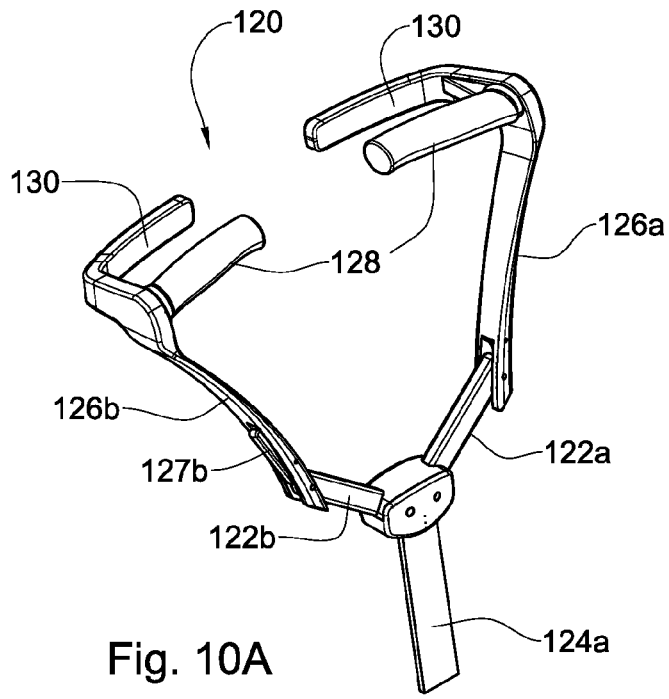
FIG. 10A is a perspective view of the steering post according to another example of the presently disclosed subject matter.
Figure 10B:
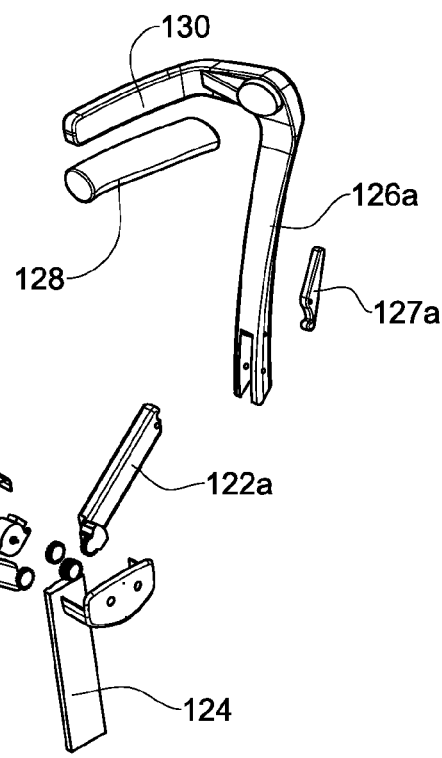
FIG. 10B is an exploded view of the steering post of FIG. 10A.

FIGS. 10A and 10B illustrates handle bars 120 according to another example of the presently disclosed subject matter. Handles 120 includes a pair of pivoting members 122a and 122b pivotally coupled to the top end of a steering post 124. The pivoting members 122a and 122b are configure to selectively pivot between a deployed position wherein they upwardly extend in an angle with respect to the steering post 124, and a folded position wherein they are downwardly folded in parallel thereto. The handle further includes a pair of bars 126a and 126b each pivotally coupled to one of the pivoting members 122a and 122b, respectively. Each bar 126a and 126b, extends substantially upwardly and include at the very top end thereof a grip portion 128 horizontally disposed and configured for gripping thereof by the rider. Each of the grip portions can further include a finger protector 130 spacely disposed parallel to the grip portion 128. Stop members 127a and 127b can be respectively provided on the bar 126a and 126b. Each stop member 127a and 127b can be configured to hold the respective pivoting member 122a and 122b in place when in the deployed position.

In the deployed position the pivoting members 122a and 122b extend upwardly and slightly sidewardly, thus the entire length of each of the bars 126a and 126b is disposed higher than the top end of the steering post 124. In this position the bars 126a and 126b are spaced from one another due to the slight angle of the pivoting members 122a and 122b with respect to the steering post 124. Thus in the deployed position the height of the grip portions 128 is such which suits a riding position of a rider standing on the deck portion of the scooter. In addition the grip portions 128 are horizontally spaced from one another such that steering thereof is comfortable is suits the position of the rider's arm when riding the scooter.

Figure 10C:
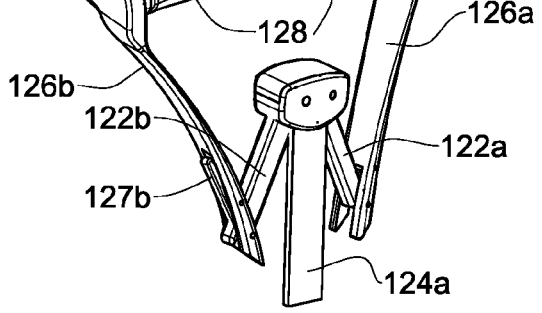
FIG. 10C is a perspective view of the steering post of FIG. 10A in the folded.

As shown in FIG. 10C, in the folded position however, the pivoting members 122a and 122b are pivoted to downwardly extended, thus a portion of the length of each of the bars 126a and 126b is disposed parallel to the steering post 124. In this position, since the pivoting members 122a and 122b are not sidewardly disposed with respect to the steering post 124, the bars 126a and 126b are disposed closer to one another with comparison to the disposition thereof in the deployed position. In addition in this position the handle bars 126a and 126b are disposed at a lower height with respect to the height thereof in the deployed position.

Thus, in the folded position the height of the grip portions 128 and the disposition thereof with respect to one another is such which suits a walking position of a rider carrying the folded scooter as a trolley while standing on the floor. In addition, in this position, the required space for the handle 120, and thus for the scooter, is minimized. According to one example shifting the handle form the deployed position to the folded position and can be carried out by releasing the stop members 127a and 127b thereby allowing the pivoting member 122a and 122b to freely pivot downwardly to the folded position. It is appreciated that shifting the handle form the deployed position to the folded position and can be carried out automatically for example by means of a motor coupled to the pivoting members 122a and 122b.

According to an example, the handle bars can be such that in the folded position they serve as a trolley carrier handle for vertical movement of the scooter. For example by handle bars can be ergonomically shaped to allow gripping thereof while standing on the deck portion in a riding position, as well as gripping thereof while standing on the floor in front of the steering post for carrying the scooter as a trolley carrier.

Those skilled in the art to which the presently disclosed subject matter pertains will readily appreciate that numerous changes, variations, and modifications can be made without departing from the scope of the invention, mutatis mutandis.

The invention claimed is:

1. A scooter foldable from a deployed position, in which said scooter is configured for riding thereon, to a folded position, in which said scooter is configured to be carried, said scooter comprises a deck portion, a tail portion foldably coupled to the deck portion, and a steering post coupled to a pair of front wheels;
   wherein said scooter when in said deployed position has said deck portion mounted on said front wheels and said tail portion positioned at the back of said deck portion and mounted on at least one rear wheel;
   wherein said scooter when in said folded position has said tail portion with said rear wheel inserted within a compartment included in said deck portion, and said steering post rotated towards said deck portion and affixed thereto, where said scooter is configured for carrying as a trolley when inclined forward and moved vertically by said front wheels wherein said deck portion comprises an upper cover configured for supporting feet of a rider standing thereon, and a chassis having two longitudinal posts defining a space therebetween configured as said compartment.

2. The scooter according to claim 1, wherein said tail portion is narrower and/or shorter than said deck portion.

3. The scooter according to claim 1, wherein said deck portion comprises an upper cover configured for supporting feet of a rider standing thereon.

4. The scooter according to claim 3, wherein said upper cover includes an elevated portion on each side thereof and two wheel protection portions each partially covering one of said front wheels.

5. The scooter according to claim 1, wherein sides of said upper cover are supported by said longitudinal posts.

6. The scooter according to claim 1, wherein said deck portion comprises a bottom cover having sides thereof supported by said longitudinal posts.

7. The scooter according to claim 1, further comprising a shoulder member configured to preclude upward rotation of said tail portion with respect to said deck portion.

8. The scooter according to claim 1, further comprising a steering locking mechanism for precluding rotation thereof between said folded position and said deployed position.

9. The scooter according to claim 1, wherein said steering post is provided with handle bars capable of folding downwardly from extending sidewardly in said deployed position to being vertically disposed parallel to said steering post in said folded position.

10. The scooter according to claim 9, wherein said handle bars in said folded position are configured to allow gripping thereof so as to maneuver said folded scooter as a trolley.

11. The scooter according to claim 1, further comprising a stand member configured for allowing vertically standing said scooter when in said folded position together with said front wheels.

12. The scooter according to claim 1, further comprising a grip portion configured such that when in said folded position so as to suit a walking position of a rider carrying said folded scooter as a trolley.

13. The scooter according to claim 1, further comprising a locking mechanism for selectively locking said tail portion in said folding position and in said deployed position.

14. The scooter according to claim 1, wherein said front wheels are positioned one of each side of said deck portion.

15. The scooter according to claim 1, wherein said front wheels are positioned underneath the front of said dock portion.

16. A scooter foldable from a deployed position, in which said scooter is configured for riding thereon, to a folded position, in which said scooter is configured to be carried, said scooter comprises a deck portion, a tail portion foldably coupled to the deck portion, and a steering post coupled to a pair of front wheels;
   wherein said scooter when in said deployed position has said deck portion mounted on said front wheels and said tail portion positioned at the back of said deck portion and mounted on at least one rear wheel;
   wherein said scooter when in said folded position has said tail portion with said rear wheel inserted within a compartment included in said deck portion, and said steering post rotated towards said deck portion and affixed thereto, where said scooter is configured for carrying as a trolley when inclined forward and moved vertically by said front wheels; and
   a tail folding mechanism and a steering post folding mechanism configured to be operated in a one action mechanism.

17. The scooter according to claim 16, comprising an automatic system for controlling operation of said one action mechanism.

18. The scooter according to claim 17, wherein said automatic system is remotely actuated by a remote control.

* * * * *